United States Patent Office 3,755,377
Patented Aug. 28, 1973

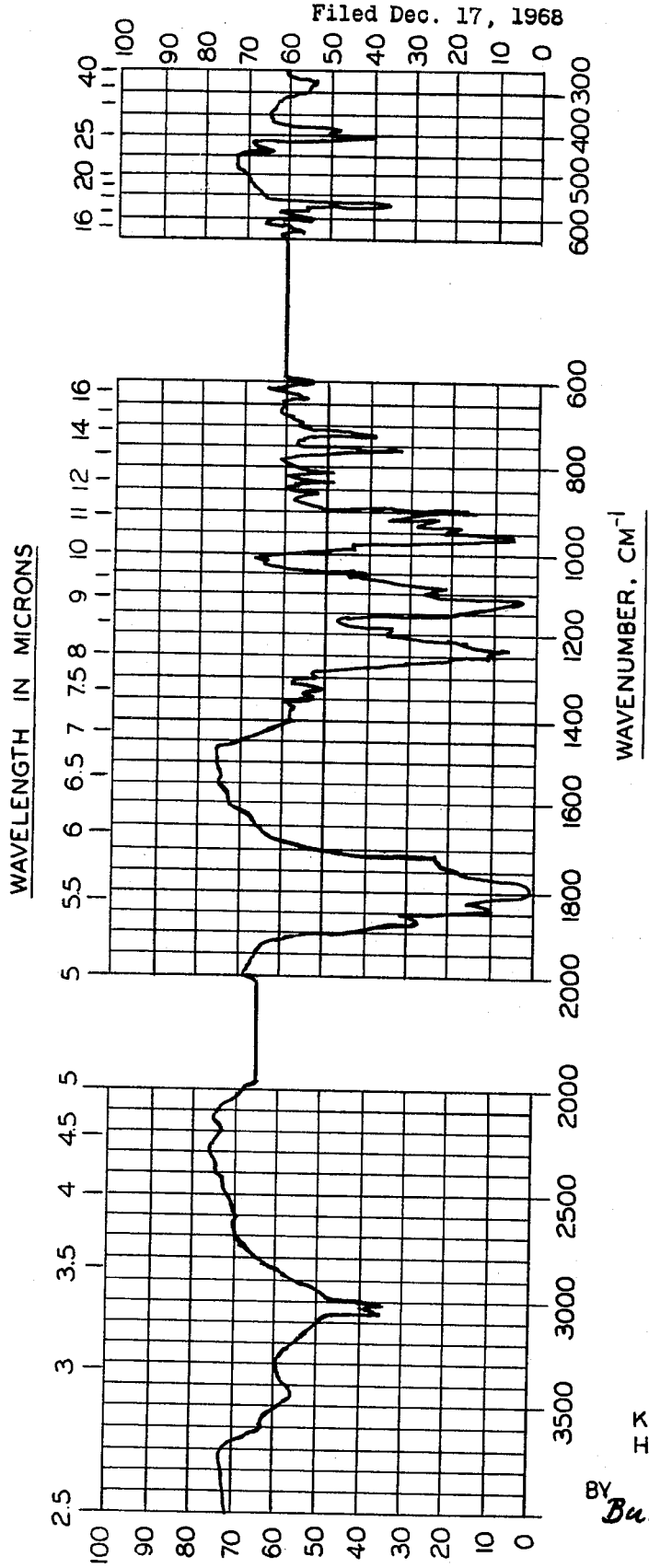

3,755,377
TETRAHYDROFURAN-2,3,4,5-TETRACARBOXYLIC ACID DIANHYDRIDE
Karl Peterlein and Heinz Rempfer, Gladbeck, Germany, assignors to Gelsenberg Aktiengesellschaft, Gelsenkirchen-Horst, Germany
Filed Dec. 17, 1968, Ser. No. 796,631
Claims priority, application Germany, Dec. 22, 1967, P 16 43 407.4
The portion of the term of the patent subsequent to Oct. 13, 1987, has been disclaimed
Int. Cl. C07d 5/26
U.S. Cl. 260—346.8     1 Claim

ABSTRACT OF THE DISCLOSURE

Tetrahydrofuran-2,3,4,5-tetracarboxylic acid dianhydride. The compound is useful for the production of polyesters, polyamides and polyimides, and as a curing agent for epoxy resins.

---

Application Ser. No. 740,451, filed June 27, 1968, now Patent 3,534,067, of Heinz Rempfer and Karl Peterlein, the applicants herein for tetracarboxylic acid and method of making same, describes the previously unknown tetrahydrofuran-2,3,4,5-tetracarboxylic acid (THFTCS) and an economical process for the manufacture thereof. This acid or its derivatives, such as esters imides, substituted imides, etc., are valuable intermediates, plasticizers and starting materials for the manufacture of temperature-stable polyesters, polyamides and polyimides for the production of fibers, sheets and resins. For the manufacture of these substances it is often desirable to start with the dianhydride of THFTCS.

It has now been found that THFTCS dianhydride can be obtained by anhydridizing the free acid at elevated temperature for example 80–140° C., preferably 120–140° C., by means of acetic anhydride, with the addition of an inert solvent if desired. Aromatic hydrocarbons, principally benzene, toluene, xylenes of other alkylbenzenes serve as inert solvents. The acetic anhydride is to be used especially in excess, i.e. more than 2 moles per mole of acid.

The subject of the present invention is tetrahydrofurantetracarboxylic acid dianhydride, characterized by the formula

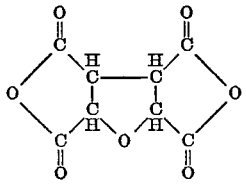

Melting point 219–221° C., neutralization number 1057 mg. KOH/g. (theory 1059). The purity of the new compound amounts to 99.5% by weight, and the infrared spectrum, recorded on a Beckman infrared spectrometer, is shown in FIG. 1.

FHTTC-dianhydride is of great value as intermediate for preparing foils, films, fibers, plastics or resins with high temperature stability. So in suitable solvents, such as dimethyl formamide or dimethyl acetamide, it may be reacted with aliphatic or aromatic diamines, whereby polyamido polycarboxylic acids result which can be dehydrated into polyimides, the latter being adapted for the manufacture of foils, films, fibers and lacquers. The dianhydride is especially well suited to harden epoxy resins, by which bodies of high temperature strength and resistance to atmospheric corrosion are formed. The dianhydride is further well suited for preparing polyester resins by reacting it in known manner with polyhydroxy alcohols as ethylene glycol propylene glycol, glycerol, pentaerythritol etc.

Monomer derivatives, as semi-esters, salts, semi-estersalts, esters and imides, may be used for different purposes, but most important is the use of the tetraesters of $C_4$–$C_{18}$, preferably $C_6$–$C_{12}$ alcohols as softener of resins.

EXAMPLE 1

25 g. of THF-2,3,4,5-tetracarboxylic acid is boiled with 40 ml. of acetic anhydride for 5 minutes. After cooling, the dianhydride is suction filtered and dried in vacuo at 100° C. Yield: 18.2 g., M.P. 219–221° C., neutralization No.: 1057.

What is claimed is:
1. Tetrahydrofuran-2,3,4,5-tetracarboxylic acid dianhydride of the formula

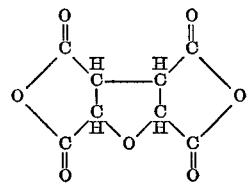

References Cited
UNITED STATES PATENTS

| | | | |
|---|---|---|---|
| 3,194,816 | 7/1965 | Van Volkenburgh | 260—346.3 |
| 3,534,067 | 10/1970 | Peterlein et al. | 260—347.3 |

OTHER REFERENCES

Fieser & Fieser: Advanced Organic Chemistry, Reinhold Pub. Co., New York (1961), p. 39.

ALEX MAZEL, Primary Examiner
B. DENTZ, Assistant Examiner